March 12, 1929.  P. E. BRENEMAN  1,704,720
BODY CONSTRUCTION
Filed Dec. 13, 1926
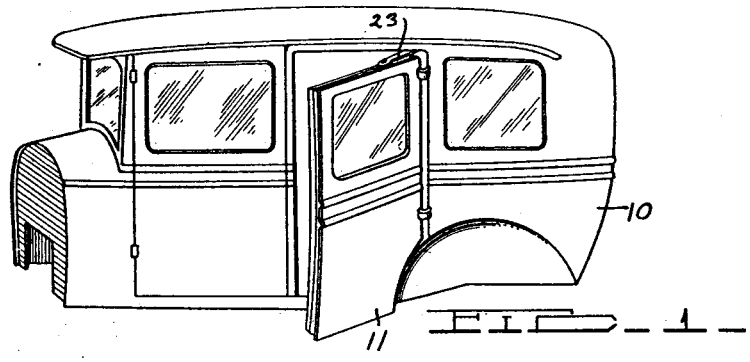
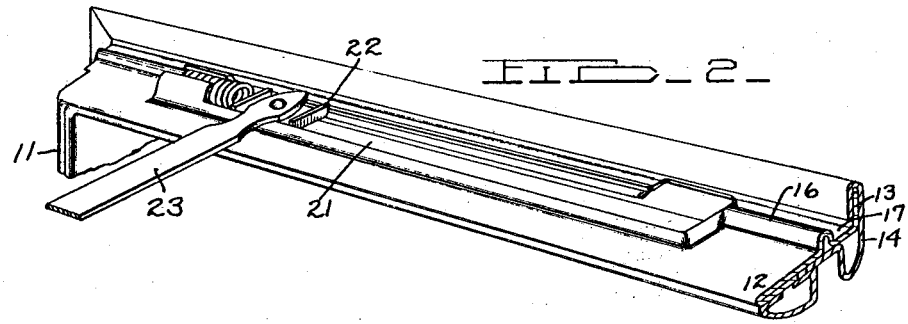
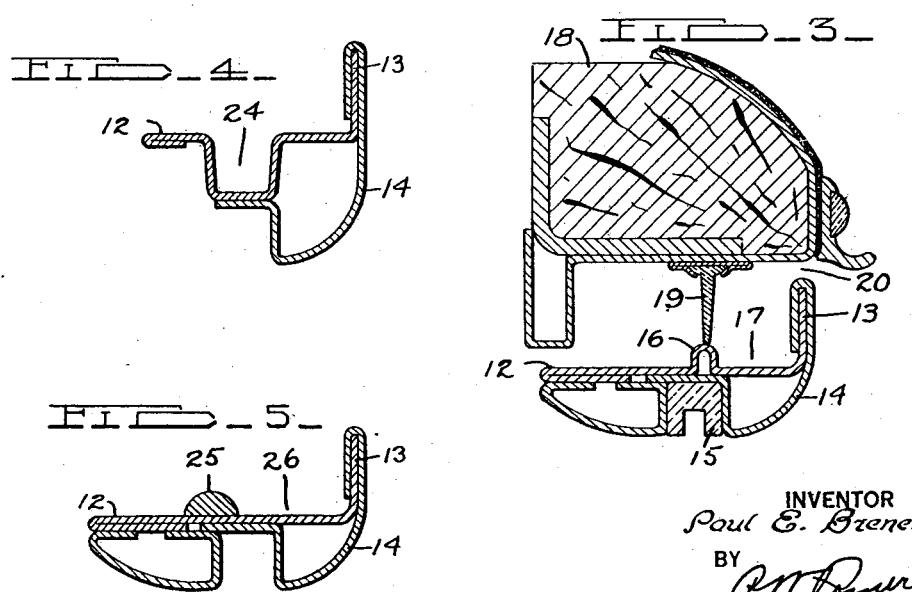
INVENTOR
Paul E. Breneman
BY
ATTORNEY Patented Mar. 12, 1929.

1,704,720

UNITED STATES PATENT OFFICE.

PAUL E. BRENEMAN, OF SOUTH BEND, INDIANA, ASSIGNOR TO THE STUDEBAKER CORPORATION, OF SOUTH BEND, INDIANA, A CORPORATION OF NEW JERSEY.

BODY CONSTRUCTION.

Application filed December 13, 1926. Serial No. 154,498.

This invention relates to bodies for motor vehicles of the closed type and particularly to the construction of the doors thereof, the principal object being the provision of means for preventing rain from passing through the joint between the top of the door and the roof rail into the interior of the body.

Another object is to provide a trough formed in the upper edge of a vehicle door for collecting and carrying away rain attempting to enter the interior of the body at this point.

Another object is to provide a trough in the upper edge of a closed vehicle door co-acting with means for providing a tight joint between the upper edge of the door and the roof rail whereby any rain entering the joint between the door and the roof rail will be collected in the trough and discharged at the edges of the door.

Another object is to provide a trough in the upper edge of a closed vehicle body door, the inner edge of which contacts with a rubber strip depending from the roof rail thereabove, whereby any rain entering the joint between the upper edge of the door and the roof rail will be deflected into the trough and discharged at the edges of the door.

A further object is to provide a door having a sheet metal upper edge with a trough formed by suitably bending such metal, and to provide a co-operating rubber strip secured to, and depending from, the co-operating roof rail whereby any rain attempting to enter the interior of the body of which the door forms a part through the joint between the roof rail and the upper edge of the door will be deflected by said strip into the trough and will be discharged therefrom at the edge of the door, thereby being prevented from entering the interior of the body.

The above being among the objects of the present invention, the same consists in certain features of the construction and combinations of parts to be hereinafter described with reference to the accompanying drawing, and then claimed, having the above and other objects in view.

In the accompanying drawing which illustrates suitable embodiments of the present invention, and in which like numerals refer to like parts throughout the several different views, Figure 1 is a perspective view of a closed automobile body provided with a construction embodying the present invention.

Figure 2 is a fragmentary perspective view of the upper edge of the door shown in open position in Figure 1, illustrating the manner in which a drain trough is provided therein.

Figure 3 is a sectional view taken transversely of the vehicle in Figure 1 with the door in closed position showing the formation and relation of the parts at the upper edge of the door and the co-acting roof rail.

Figure 4 is a sectional view through the upper edge of the door illustrating a modified form of construction.

Figure 5 is a view similar to Figure 4 showing another modified construction.

In the construction of automobile bodies of the closed type, particularly such bodies as are built in quantity production, it is extremely difficult to consistently provide a tight joint between the upper edge of the doors and the roof rail thereabove and still retain a freely swingable door. For this reason it will invariably be found that there is a substantial space at this point. The usual method of preventing air or rain from passing therethrough is to attach a welt to the inside face of the roof rail so that when the door is in closed position its inner edge will abut against this welt and provide a tight joint. This type of joint, however, has been found very unsatisfactory for preventing rain from entering the interior of the body due to the fact that any rain entering this point is trapped between the usual upwardly extending marginal flange at the outer edge of the door and such welt and works its way down between the welt and the door. The method herein provided does not attempt to prevent the entrance of rain between the upper edge of the door and associated roof rail, but instead provides means for collecting any rain entering at this point and discharging it at the edges of the door. This is done by forming a trough in the upper edge of the door and providing means for deflecting any rain entering into the trough, whereby the rain will be carried to the edge of the door and discharged in such a manner as to prevent it from entering the interior of the body. In accordance therewith I show in Figure 1 an automobile body 10 having a door 11 the upper edge of which is formed in accordance with the present invention. As shown in Figure 3, which is a sectional view taken transversely of the body centrally of the upper edge of the door and the roof rail with the door in closed position, the upper edge of the door 11 comprises a pressed metal frame member 12 having an upwardly disposed marginal outer edge portion 13. The paneling 14 of the door is reversibly bent over this flange 13 and extends downwardly and inwardly therefrom to a point adjacent the window guiding channel 15 when it is bent upwardly to meet the edge portion 12 to which it is secured. Approximately midway between the front and rear edges of the frame member 12, the metal of the frame member 12 is bent upwardly and then back on itself to form an upwardly extending projection 16 which extends from one end of the door to the other. This forms a trough 17 between the projection 16 and the marginal flange portion 13, which of course, also extends the full length of the door.

Secured to the lower face of the roof rail 18 of the body 10 by suitable means directly above the projections 16 when the door is in closed position, and extending the full length of the door, is a downwardly depending resilient strip or wiper member 19 formed of rubber or similar material, the lower edge of which bears against the projection 16. With this construction, should any rain enter the space 20 between the upper edge of the door 11 and the lower face of the roof rail 18, the strip 19 will deflect the same into the trough 17 where it will collect and will drain to the forward or rear edge of the door 11 and will follow down such edge from the bottom of the body.

As shown in Figure 2 this construction of upper door edge may be formed to provide a slot 21 for slidably receiving the end 22 of a door check arm 23. In such cases the metal of the frame 12 adjacent the edge of the slot 21 is bent upwardly and inwardly to provide clearance therebelow for the end 22. As further shown in Figure 2 this upwardly extending edge of the slot 21 may be utilized for the length of the slot 21 as a portion of the upwardly extending projection 16, making it necessary in such a case to form the actual projection 16 only from the ends of the slot 21 to the ends of the door.

In Figure 4 is shown a modified manner of providing a slot at the upper edge of the door. In this case instead of bending the metal of the frame member 12 upwardly to form a projection such as 16 in Figure 3, it is formed to provide a substantial depression 24 extending its full length and serving alone the same purpose as the trough 17 in Figure 3. In this case it will be apparent that the strip member 19 must be extended to contact against the horizontal upper face of the frame 12.

Another modification of this construction is shown in Figure 5 in which instead of forming the metal of the frame member 12 to provide an upwardly extending portion such as 16 in Figure 3, a molding member such as 25 is secured to the upper face thereof in a position to effect the same result as the projection 16 in Figure 3, the result for the formation of the trough 26 serving the same purpose as the trough 17 in Figure 3.

Formal changes may be made in the specific embodiment of the invention described without departing from the spirit and substance of the broad invention, the scope of which is commensurate with the appended claims.

What I claim is:

1. In combination with a vehicle body of the closed type, a trough formed in the upper edge of a door thereof, and means secured to the roof of said body inwardly of said trough for deflecting rain at said edge into said trough.

2. In combination with a vehicle body of the closed type, a trough formed in the upper edge of a door thereof, and means carried by the roof rail of said body above said door intermediate the inner and outer faces thereof whereby rain entering between said roof rail and said door will be deflected into said trough.

3. In combination with a vehicle body of the closed type, a swingable door provided with a trough in the upper end thereof adjacent its front face and spaced from its inner face, and means carried by said body inwardly of said trough co-acting with the upper edge of said door whereby water entering the joint between the upper edge of said door and said body will be deflected into said trough.

4. In combination with a vehicle body of the closed type, a door for said body provided with a trough in the upper edge thereof adjacent its outer face extending substantially the full length of said edge, and a deflector member carried by said body inwardly of said trough co-acting with said edge for deflecting water into said trough.

5. In combination with a vehicle body of the closed type, a door for said body provided with a trough extending substantially the full length of the upper edge thereof, and a wiper strip carried by said top above said door and engaging the upper edge of said door inwardly of said trough for deflecting water into said trough.

6. In combination with a vehicle body of the closed type, a door for said body provided with a trough in the upper edge thereof extending substantially the full length thereof, and a flexible strip carried by said top above said door inwardly of said trough in wiping relation therewith for deflecting water entering the joint between said upper edge of said door and said top into said trough.

7. In combination with a door provided with a sheet metal upper edge having an upwardly extending outer marginal flange, the metal of said edge being formed to provide an upwardly extending bead spaced from and parallel to said marginal flange to form an upwardly opening trough between said bead and said flange.

8. In combination with a door having a sheet metal upper edge provided with an upwardly extending marginal flange at the outer edge thereof, a slot formed in said upper door edge for the reception of a door-check end, the metal about said slot being upwardly bent, and an upwardly extending bead spaced from said outer marginal flange extending from said slot to the front and rear edge of said door to form with the metal about said slot a trough extending the full width of said door.

9. In combination with a vehicle body of the closed type, a door comprising an upper sheet metal edge member and an outer sheet metal panel member, said edge member having a depression formed therein below the normal plane of said edge member to provide a longitudinally extending trough and further provided with an upwardly extending flange at the outer face of said door, and said panel member having an inwardly extending portion secured to said edge member beneath said depression and having an upwardly extending flange secured to the flange on said edge member.

10. In combination with a vehicle body of the closed type, a door comprising an upper sheet metal edge member provided with a horizontally extending portion having a relatively deep pocket therein below the normal plane of said edge member constituting a water trough and having a vertically extending flange at its outer edge, an outer panel member secured adjacent one end to the face of said depression and at its opposite end to said flange.

11. In combination with a vehicle body of the closed type having a wiper member secured to the head rail thereof, a door comprising an upper sheet metal edge member provided with a horizontally extending portion having a relatively deep pocket therein constituting a water trough, said wiper being positioned inwardly of said depression to prevent any water entering the interior of said body.

Signed by me at South Bend, Indiana, this 10th day of December, 1926.

PAUL E. BRENEMAN.